United States Patent [19]

Hawkins

[11] Patent Number: 4,862,795
[45] Date of Patent: Sep. 5, 1989

[54] COOKTOP GRILL WITH IMPROVED REFLECTOR PAN

[75] Inventor: Ralph G. Hawkins, Louisville, Ky.
[73] Assignee: General Electric Company, Louisville, Ky.
[21] Appl. No.: 202,334
[22] Filed: Jun. 6, 1988
[51] Int. Cl.$^4$ .............................. F24C 7/04; F24C 7/06
[52] U.S. Cl. ..................................... 99/446; 126/211; 126/1 R; 219/443; 99/444
[58] Field of Search ............... 126/214 R, 39 R, 37 R, 126/211, 41 R, 41 A, 41 B, 41 C, 41 D, 41 E, 300, 301, 302, 303, 214 A, 39 M, 51; 99/400, 444, 445, 446; 219/443, 445, 460, 461, 467

[56] References Cited

U.S. PATENT DOCUMENTS

| | | | |
|---|---|---|---|
| 3,161,191 | 12/1964 | Stoligrosz et al. | 126/214 R X |
| 3,292,528 | 12/1966 | Myler | 99/446 |
| 3,356,012 | 12/1967 | Rosen | 99/446 |
| 3,444,805 | 5/1969 | Happel et al. | 99/340 |
| 3,474,724 | 10/1969 | Jenn | 99/259 |
| 3,487,199 | 12/1969 | Hamlin | 219/399 |
| 3,527,154 | 9/1970 | Shaper et al. | 99/400 |
| 3,678,844 | 7/1972 | Marshall | 99/340 |
| 3,745,912 | 7/1973 | Field | 99/446 |
| 3,797,375 | 3/1974 | Cerola | 99/340 |
| 3,805,688 | 4/1974 | Gvozdjak | 99/425 |
| 4,009,795 | 3/1977 | Hurko et al. | 219/461 X |
| 4,034,663 | 7/1977 | Jenn et al. | 99/446 |
| 4,378,412 | 3/1983 | Snyders | 428/573 |
| 4,508,097 | 4/1985 | Berg | 126/41 R |
| 4,736,729 | 4/1988 | Beach | 126/214 A X |

Primary Examiner—Robert E. Garrett
Assistant Examiner—Carl D. Price
Attorney, Agent, or Firm—H. Neil Houser; Radford M. Reams

[57] ABSTRACT

A cooking appliance equipped for indoor grilling includes an integrally formed, sheet metal reflector pan interposed between the grill member and the drip pan. The reflector pan has a bottom wall which extends beneath the heating element and four generally upwardly extending side walls to shield the area laterally adjacent the grill area from the radiant energy of the heating element. The reflector pan is configured between its corners to define an air gap between the reflector pan and the adjacent cooktop which provides an air flow path between the area above the cooktop and the area between the drip pan and the reflector pan. When the heating element is energized cooling air is drawn by convection from above the cooktop downwardly through the air gap into the area between the drip pan and the reflector pan and upwardly through narrow slots in the bottom of the reflector pan.

10 Claims, 4 Drawing Sheets

COOKTOP GRILL WITH IMPROVED REFLECTOR PAN

BACKGROUND OF THE INVENTION

This invention relates to range and cooktop appliances with indoor grilling capability and more specifically to an improved reflector pan for use in such appliances.

Range and cooktop appliances in which a portion of the surface cooking area is adaptable to provide a grilling area for indoor grilling are well known and readily commercially available in both updraft and downdraft models.

When such appliances are equipped with a broiler element of sufficiently high temperature for searing meat satisfactorily, it is necessary to protect grease drippings collecting beneath the grill area from excessive heat to prevent uncontrolled flame-ups or flash fires and also to protect the countertops and cabinetry adjacent the grill area from excessive heat caused by radiant energy from the heating element. U.S. Pat. No. 3,444,805 discloses an example of such an appliance equipped with a down draft venting capability, in which a slot is provided in the side wall of the cooktop rough-in box, and cooling air is drawn from beneath the countertop outside the rough-in box through the slot into the space beneath the drip pan and into the external plenum by the down draft blower. A layer of pieces of refactory type material simulating charcoal briquettes is supported beneath the heating element on a flat perforated tray which overlies the drip pan. This briquette layer serves to absorb heat from the heating element to cause drippings falling thereon to smoke, thus imparting added flavor to cooking meat. In U.S. Pat. No. 3,745,912 the briquettes are replaced with a heat sink plate made of cast iron or similar alloy and configured to perform the dual functions of partially searing grease drippings impinging thereon for smokey flavoring of the meat, and to define heat sink or modulating means whereby heat absorbed from the heating element is re-emitted back toward the broiling area at a higher rate than toward the grease drippings to reduce the chances of sustained combustion. The upper surface is configured to maximize exposed surface area and the lower surface has preferably less exposed area to return maximum heat to broiling area and transmitting only less heat to the grease collection area beneath the heat sink plate.

The aforementioned arrangements have certain disadvantages, for example, both the briquette layer and the cast iron plate tend to absorb grease and are heavy and awkward to handle, making cleaning a chore. Also, cast iron tends to rust after cleaning. Additionally, in the 805 arrangement, means must be provided in the cabinetry adjacent the cooktop to permit fresh air from the kitchen to enter the side slots in the rough-in box.

It is therefore an object of the present invention to provide an improved reflector pan with a bottom wall to shield the grease collector area beneath the grill from radiant energy and side walls to shield the sides of the grill area from radiant energy from the heating element, and which is relatively light weight, durable, rust resistant and easy to clean.

It is a further object of the present invention to provide a reflector pan which cooperates with the cooktop surface surrounding the grill area to define an air flow path which permits cooling air from above the cooktop to enter the area between the drip pan and the reflector pan eliminating the need for slots in the case and complementary openings in the adjacent cabinetry.

SUMMARY OF THE INVENTION

An improved reflector pan is provided for a cooktop or range type of cooking appliance of the type comprising a case with side walls and a bottom wall and a cooktop member comprising the top wall thereof, the cooktop member having formed therein a generally rectangular opening defining a grill area, a removable grill member covering the opening for supporting food items for grilling, a drip pan supported in the grill area opening beneath the grill member to catch drippings from the items supported on the grill member, and a heating element received in the grill area opening extending beneath the grill member above the bottom wall of the drip pan.

The improvement in accordance with the invention comprises a generally rectangular, integrally formed, sheet metal reflector pan interposed in the grill area opening between the grill member and the drip pan. The reflector pan has a bottom wall which extends beneath the heating element and four side walls extending generally upwardly from the bottom wall to shield the area laterally adjacent the grill area from the radiant energy of the heating element. The pan side walls have a continuous outwardly turned flange formed at the upper edge thereof. In the corner regions defined by the intersection of the side walls, the flange overlappingly engages the cooktop member adjacent the corners of the grill opening to support the reflector pan in the opening. The side walls and flange are configured between the corner regions to define an air gap between the reflector pan and cooktop member adjacent thereto. This gap provides an air flow path between the area above the cooktop member and the area between the drip pan and the reflector pan. The bottom wall of the reflector pan has a plurality of narrow slots formed therein to permit drippings from the food items on the grill to pass downwardly through the reflector pan to the drip pan below and to permit air flow therethrough. By this arrangement of air gap and slots, when the heating element is energized cooling air is drawn by convection from above the cooktop member downwardly through the air gap into the area between the drip pan and the reflector pan and upwardly through the slots. The cooling effect of this air flow together with the radiation shielding effect of the reflector pan side walls prevent excessive ambient temperatures on the cooktop surface adjacent the grill area and in the area between the side walls of the drip pan and the case, so as to protect the adjacent countertops and cabinetry.

The reflector pan is preferably formed of sheet metal with a gray enamel finish. Alternately, the pan may be formed of aluminum with a bright metal finish.

BRIEF DESCRIPTION OF THE DRAWINGS

While the novel aspects of the invention are set forth with particularity in the appended claims, the invention both as to organization and content will be better understood and appreciated from the following detailed description taken in conjunction with the drawings in which:

DETAILED DESCRIPTION

Figure 1:
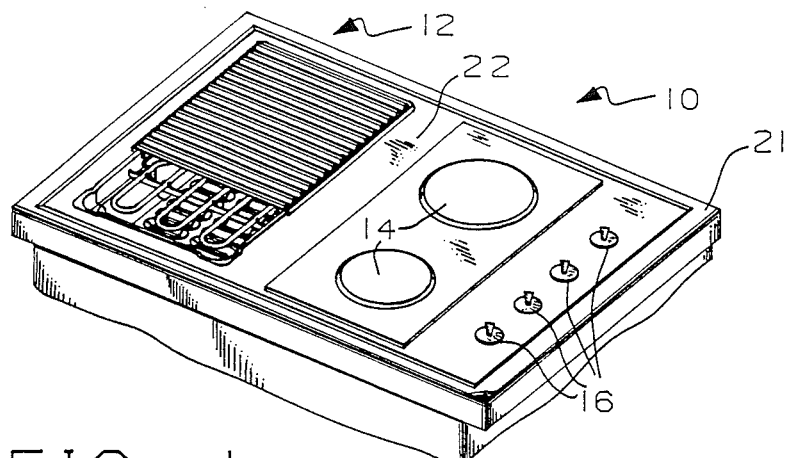
FIG. 1 is a perspective view with parts broken away of a cooktop appliance illustratively embodying the improved reflector pan of the present invention.

Referring now to FIGS. 1-6, a cooktop cooking appliance generally indicated at 10 includes a grill area designated generally 12. Grill area 12 occupies one side of cooktop appliance 10 with the other side including solid disk surface units 14 and control knobs 16, which may be of conventional configuration.

Figure 2:
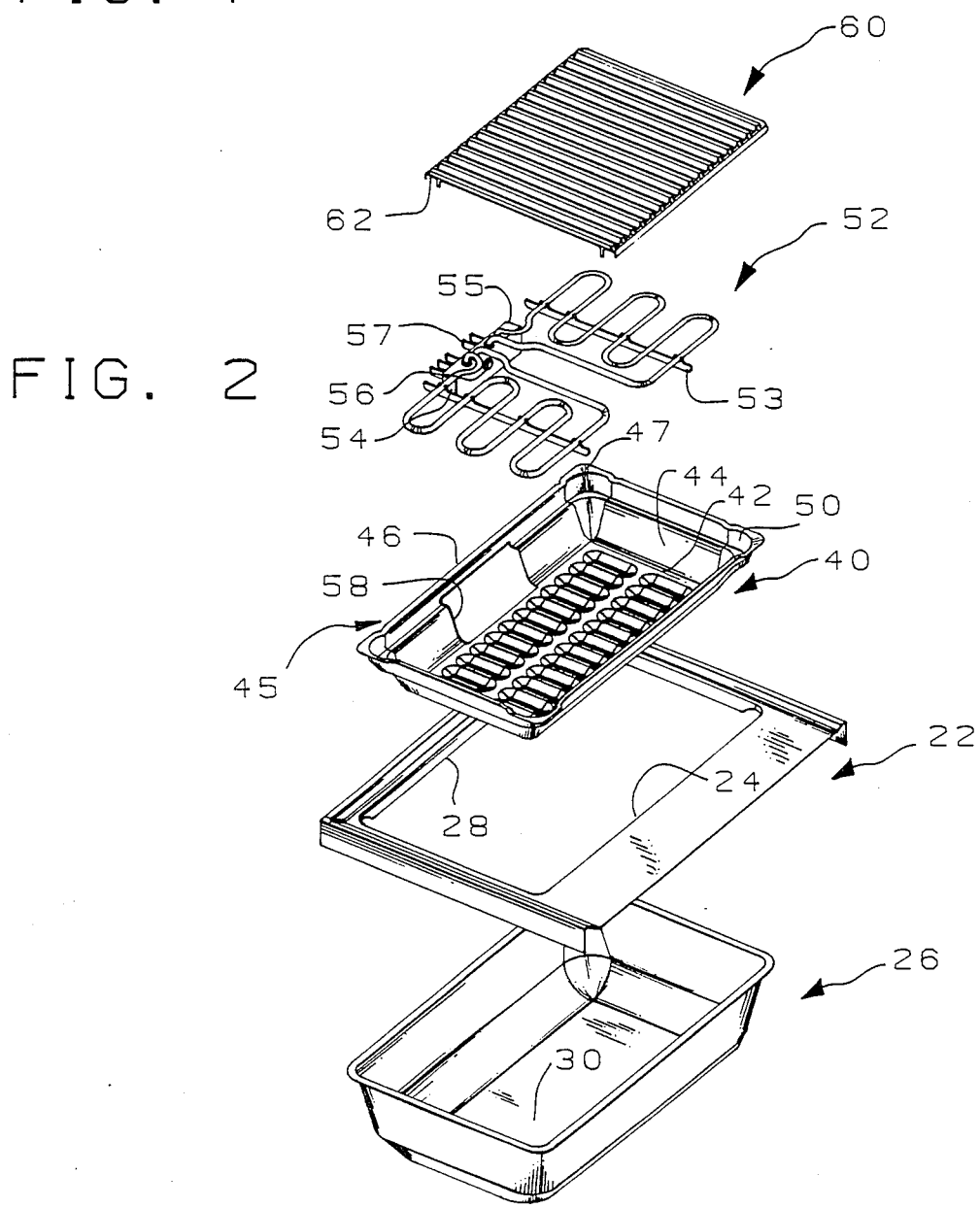
FIG. 2 is an exploded perspective view of the grill accessories of the cooktop of FIG. 1.
Figure 3:
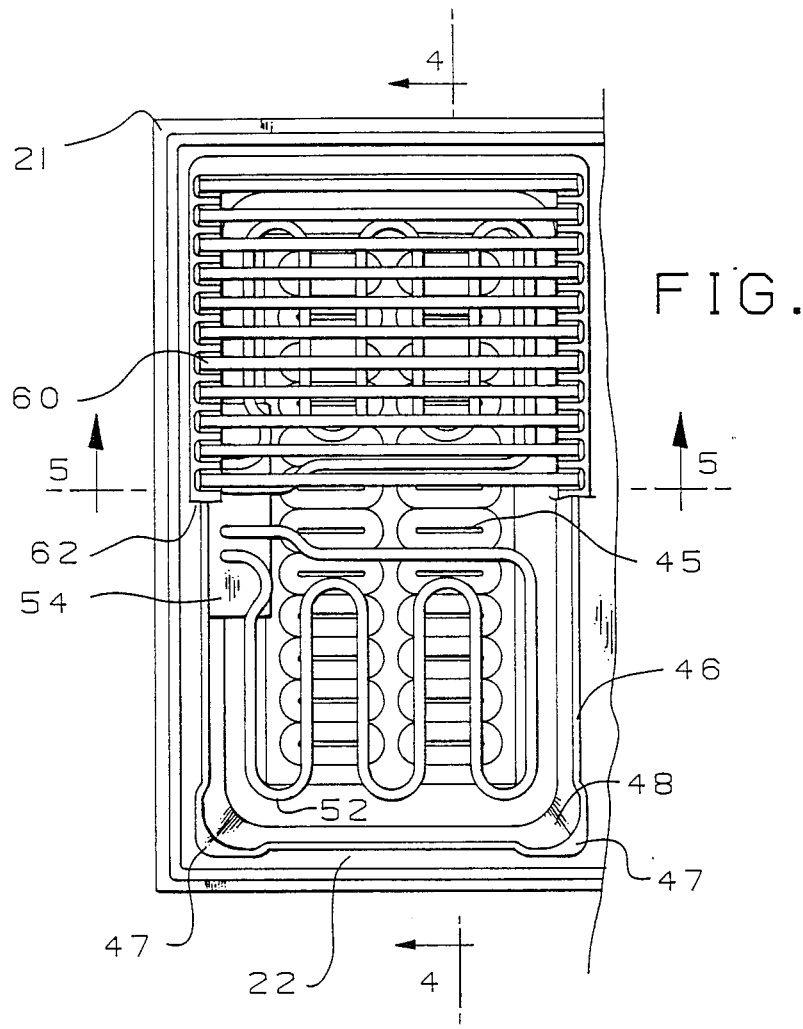
FIG. 3 is a top view with portions removed of the grill area of the cooktop appliance of FIG. 1.
Figure 4:
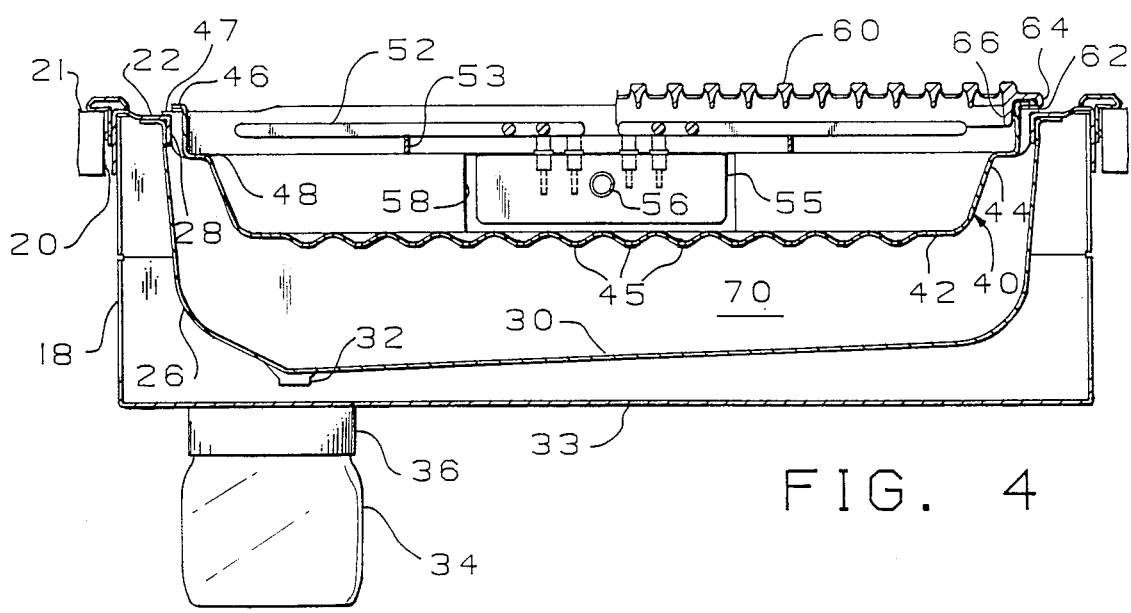
FIG. 4 is a sectional side view taken along lines 4—4 of FIG. 3.
Figure 5:
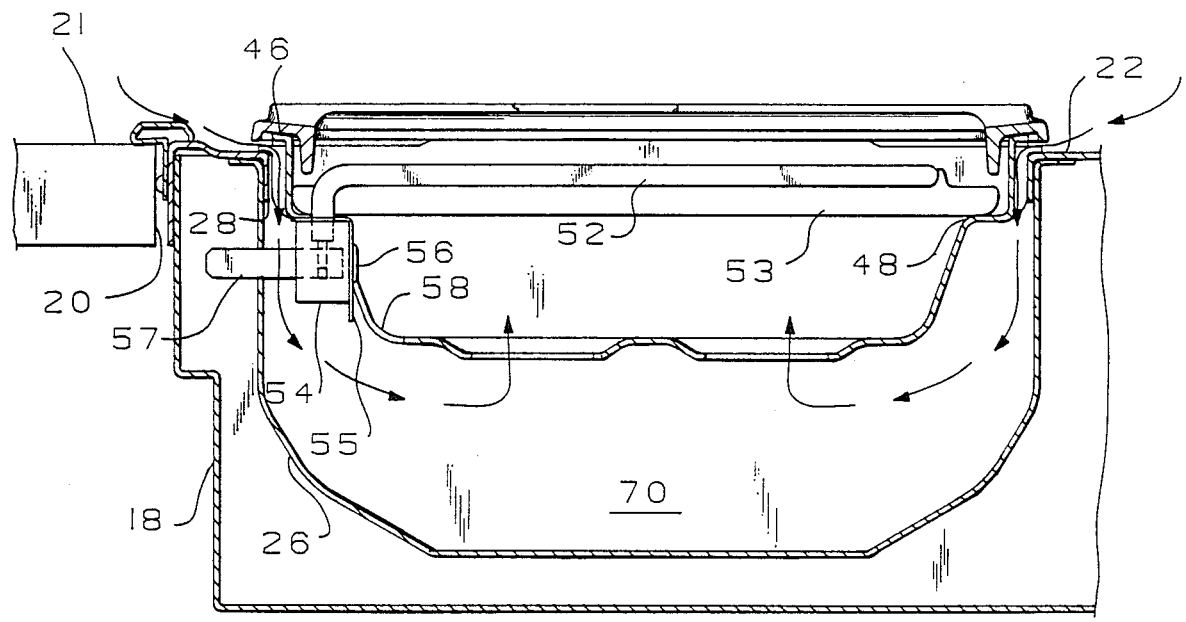
FIG. 5 is a sectional front views taken along lines 5—5 of FIG. 3.
Figure 6:
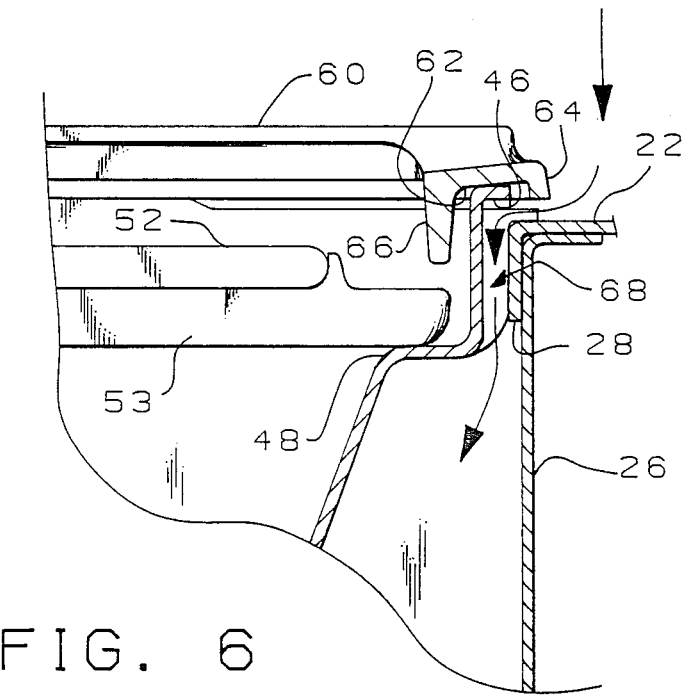
FIG. 6 is a view of a portion of FIG. 5 enlarged to more clearly show details thereof.
Figure 7:
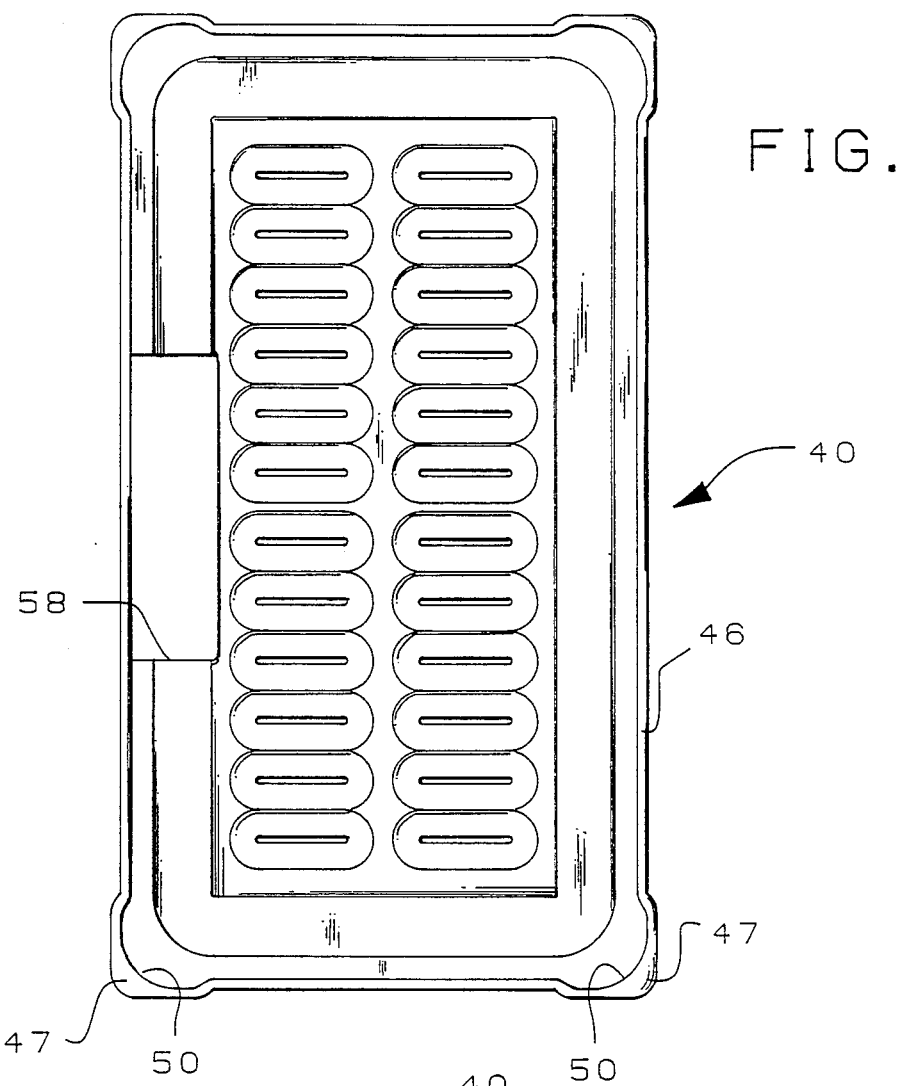
FIG. 7 is a top view of the reflector pan in FIG. 2.
Figure 8:
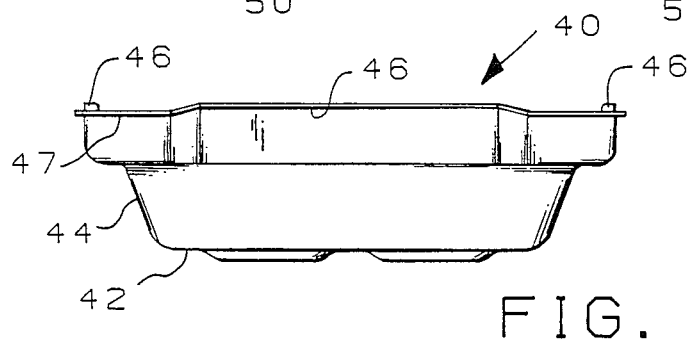
FIG. 8 is a front view of the reflector pan in FIG. 2.
Figure 9:
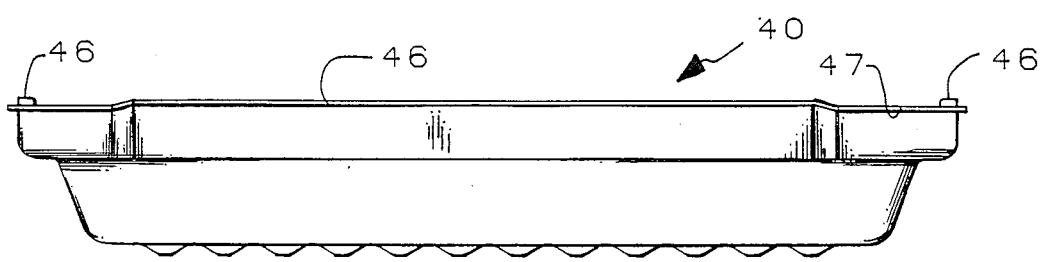
FIG. 9 is a side view of the reflector pan in FIG. 2.

As best seen in FIGS. 2, 4 and 5, cooking appliance 10 comprises an open topped case 18 formed of sheet metal which encloses the bottom and sides of the appliance and is adapted to be supported in an opening 20 in countertop 21. The open top of case 18 is substantially covered by sheet metal cooktop member 22 which serves as the top wall of the case. Cooktop member 22 is provided with appropriate openings to accommodate the control knobs 16, surface units 14. The generally rectangular opening 24 in cooktop member 22 defines the lateral expanse of the grill area 12. The grill accessories as best seen in FIG. 2 include a sheet metal drip pan 26, a reflector pan 40, a heating element 52, and a grill member 60.

Drip pan 26 is a sheet metal pan which is received beneath opening 24. Drip pan 26 is supported from cooktop member 22 by suitable attachment of the upper edges of the side walls of drip pan 26 to a downwardly extending flange 28 formed on cooktop member 22 which circumscribes opening 24, such as by screws. As best seen in FIG. 4, bottom wall 30 of drip pan 26 generally slopes from back to front toward a drain opening 32 formed at the lowest point of wall 30. A grease collector jar 34 is removably mounted to the outside of bottom wall 33 of case 18. A jar lid 36 is suitably secured to bottom wall 33. Openings aligned with drain opening 32 are formed in both bottom wall 33 and lid 36. Grease drippings flow down the sloped bottom wall 30 of drip pan 26 and through drain opening 32 into jar 34.

Reflector pan 40 is received in grill defining opening 24 with side and bottom walls displaced from the side and bottom walls respectively of drip pan 26. Reflector pan 40 is an integrally formed sheet metal part having a bottom wall 42 which extends over and is spaced above the bottom wall 30 of drip pan 26, and side walls 44 which extend generally upwardly with an outward slope from bottom wall 42. The bottom and side walls of reflector pan 40 tend to reflect the radiant energy from element 52 back toward the grill area, thereby shielding the area beneath and beside element 52 from such radiant energy.

Bottom wall 42 has formed therein a plurality of long narrow slots 45 which permit drippings from food items being grilled to pass through to grease drip pan 26. Side walls 44 terminate in a continuous outwardly turned flange 46 at the upper edges thereof designated 46 along the side walls between the corner regions and 47 in the corner regions. A circumferential inwardly extending shoulder 48 is formed part way up the side walls 44, for supporting heating element 52 as hereinafter described. The side walls 44 intersect in rounded corners 50. The corners 50 above shoulder 48 are radially outwardly expanded relative to the side walls 44 between the corners. The radially expanded corner dimensions are selected to match the corners of the cooktop opening 24 to properly align and stably support reflector pan 40 in the opening. Flange 47 in the corner regions overlappingly engages cooktop member 22 adjacent the corners of opening 24 to support pan 40 in the opening.

Heating element 52 is a plug-in type sheathed resistance heating element extending generally parallel to and spaced above bottom wall 42 of reflector pan 40 and below the top planar surface of cooktop member 22, and supported by support members 53 which rest on shoulder 48 of reflector pan 40. Element 52 includes a porcelain plug-in terminal block 54. A stainless steel radiation shield 55 of L-shaped cross-section covers the top and inner face of porcelain block 54. Shield 55 is secured to block 54 by a pin 56 which projects on through the block and serves as the grounding pin. Terminal blades 57 project from block 54 for electrical connection to a plug-in receptacle (not shown) mounted in case 18 and adapted for connection to the external power supply. Block 54 projects through opening 58 in the outer side wall of reflector pan 40 for insertion in the plug-in terminal with shield 55 substantially filling opening 58.

Grill member 60 is removable cast iron grate 60 which spans grill opening 24. A downwardly facing channel 62 is formed about the peripheral edge of grate 60. When grate 60 is properly positioned, channel 62 fits over and rests on upwardly extending side flange portion 46 of reflector pan 40. The outer wall 64 of channel 62 is shorter than the inner wall 66 to provide clearance for a cooling air gap between the reflector pan side wall and the adjacent cooktop member 22 hereinafter described.

In order to provide additional protection against excessive temperatures at the cooktop surface adjacent the grill area and in the area between the side walls of drip pan 26 and of case 18, and to support limited combustion of drippings impinging on bottom wall 42 of reflector pan 40, reflector pan 40 is configured to provide an air flow path from above cooktop member 22 into the area between drip pan 26 and reflector pan 40.

As hereinbefore described, the corners of reflector pan 40 above shoulder 48 are radially expanded relative to the side walls 44 to engage the sides of rectangular opening 24 adjacent the corner. Consequently, the side walls 44 of reflector pan 40 above shoulder 48 between the corners are laterally inwardly displaced relative to the adjacent edge of cooktop member 22, such that with reflector pan 40 properly seated in opening 26, lateral spacing is provided between the cooktop member 22 and the side walls 44 of reflector pan 40. As best seen in FIGS. 4-9, the side wall flange portions 46 are upwardly and inwardly displaced relative to the corner flange portions 47.

The upward displacement of the side wall flange portions 46 between the corners provides a vertical displacement of the flange 46 relative to the cooktop member 22. This displacement of flange 46 and side walls 44 define an air gap 68 between side walls 44, reflector pan 40 and the cooktop member 22 between the corners which provide an air flow path between the area above cooktop 22 and the area 70 between reflector pan 40 and the drip pan 26. Slots 45, which in reflector pan 40 permit drippings to pass downwardly therethrough, also permit air flow therethrough. When the heating element is energized, cooling air is drawn by convection from above the cooktop downwardly through air gap 64 into area 70 between the drip pan 26 and reflector pan 40 and upwardly through slots 45 as shown by the arrows in FIGS. 5 and 6.

The air gap and slot dimensions are selected to permit sufficient air flow to cool the area between the reflector pan and the drip pan while at the same time limiting the air flow into the area above the reflector pan bottom wall to prevent uncontrolled flame-ups.

Bottom wall 42 of reflector pan 40 shields the drip pan 26 area from radiant energy from heating element 52. Side walls 44 of reflector pan 40 similarly protect the perimeter of the grill opening from radiant energy from heating element 52. This shielding effect of the reflector pan side walls together with the cooling air flow between reflector pan 40 and drip pan 26 prevent the occurrence of excessive temperatures at the surface of cooktop 22 adjacent the grill area and in the area between drip pan 26 and the side walls of case 18. A reduction on the order of 50 degrees C has been empirically demonstrated at the cooktop surface adjacent the grill area using reflector pan 40 compared to use of a reflector pan without side walls to provide the air flow path and shielding effect.

In the illustrative embodiment the reflector pan is formed of porcelain enameling quality carbon steel nominally 0.036 inches thick with a gray porcelain enamel finish.

It will be appreciated that the reflector pan could also be formed of aluminum, and could be provided with a bright metal finish.

While in accordance with the Patent Statutes, a specific embodiment of the present invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. In a cooking appliance of the type supported in a countertop comprising a case with side walls, a bottom wall, and a top wall, which top wall comprises a cooktop member, the cooktop member having formed therein a generally rectangular opening defining a grill area, a removable grill member covering the opening for supporting food items for grilling, a drip pan received in the grill area opening beneath the grill member, said drip pan having a sloped bottom wall spaced from the bottom wall of the case to catch drippings from food items supported on the grill member, and a heating element received in the grill area opening extending beneath the grill member above the bottom wall of the drip pan, the improvement comprising:

a generally rectangular, integrally formed, sheet metal reflector pan disposed in the grill area opening between the grill and the drip pan, said reflector pan comprising a bottom wall extending beneath the heating element, and four side walls, extending generally upwardly from said bottom wall to shield that portion of the cooktop member surrounding the grill area from radiant energy from the heating element, said side walls having formed at the upper edge thereof a continuous outwardly turned flange, the intersection of said side walls defining corner regions, said flange overlappingly engaging the cooktop member adjacent each corner of the rectangular grill area opening to support said reflector pan in the opening, said flange and side walls being configured between said corner regions to define an air gap between said reflector pan and the cooktop member adjacent thereto, said gap providing an air flow path between the area above the cooktop member and the area between the drip pan and said reflector pan, said bottom wall of said reflector pan having formed therein a plurality of narrow slots to permit drippings from food items on the drill member to pass downwardly therethrough to the drip pan, and to permit air to flow therethrough, whereby when the heating element is energized cooling air from above the cooktop member flows downwardly through said air gap into the area between the drip pan and said reflector pan and upwardly through said slots.

2. The improvement of claim 1 wherein said reflector pan comprises a gray enamel finish.

3. The improvement of claim 1 wherein said reflector pan is formed of aluminum and comprises a bright metal finish.

4. The improvement of claim 1 wherein a peripheral inwardly extending shoulder is formed in said reflector pan side walls to support the heating element thereon.

5. The improvement of claim 1 wherein said corner regions are rounded, with the upper portion of each corner region being radially expanded relative to the upper portion of said side walls proximate thereto.

6. In a cooking appliance of the type supported in a countertop comprising a case with side walls, a bottom wall, and a top wall, which top wall comprises a cooktop member, the cooktop member having formed therein a generally rectangular opening defining a grill area, a removable grill member covering the opening for supporting food items for grilling, a drip pan received in the grill area opening beneath the grill member, said drip pan having a sloped bottom wall spaced from the bottom wall of the case to catch drippings from food items supported on the grill member, and a heating element received in the grill area opening extending beneath the grill member above the bottom wall of the drip pan, the improvement comprising:

a generally rectangular, integrally formed, sheet metal reflector pan disposed in the grill area opening between the grill and the drip pan, said reflector pan comprising a bottom wall extending beneath the heating element generally parallel to the grill member, and four side walls, extending generally upwardly from said bottom wall to shield that portion of the cooktop member surrounding the grill area from radiant energy from the heating element, the intersection of said side walls defining corner regions, each of said side walls terminating at its upper edge in an outwardly turned flange, said flange comprising corner flange portions proximate said corner regions and side flange portions connecting said corner portions, said corner flange portions overlappingly engaging the cooktop member adjacent the corners of the rectangular grill area opening to support said reflector pan in the opening, at least one of said side walls being laterally spaced from the adjoining portion of the cooktop member and said corresponding side flange portions being upwardly and inwardly displaced relative to said corner flange portions, to define an air gap between said displaced side wall and side flange portion and the cooktop member adjacent thereto, said gap providing an air-flow path between the area above the cooktop member and the area between the drip pan and said reflector pan, said bottom wall of said reflector pan having formed therein a plurality of narrow slots to permit drippings from food items on the grill member to pass downwardly therethrough to the drip pan, and to permit air to flow therethrough, whereby when the heating element is energized, cooling air is drawn by convection from above the cooktop downwardly through said air gap into the area between the drip pan and said reflector pan and upwardly through said slots.

7. The improvement of claim 6 wherein said reflector pan comprises a gray enamel finish.

8. The improvement of claim 7 wherein said reflector pan is formed of aluminum and comprises a bright metal finish.

9. The improvement of claim 8 wherein a peripheral inwardly extending shoulder is formed in said reflector pan side walls to support the heating element thereon.

10. The improvement of claim 6 wherein said corner regions are rounded, with the upper portion of each corner region being radially expanded relative to the upper portion of said side walls proximate thereto.

* * * * *